United States Patent
Cibie

[11] Patent Number: 6,046,580
[45] Date of Patent: Apr. 4, 2000

[54] ELECTRICAL INSTALLATION USING ELECTROMAGNETIC INDUCTION

[76] Inventor: Pierre Cibie, L'Albatros, 7 boulevard Albert 1er, 98000 Monaco, Monaco

[21] Appl. No.: 09/171,351

[22] PCT Filed: Apr. 15, 1997

[86] PCT No.: PCT/FR97/00669

§ 371 Date: Oct. 16, 1998

§ 102(e) Date: Oct. 16, 1998

[87] PCT Pub. No.: WO97/39510

PCT Pub. Date: Oct. 23, 1997

[30] Foreign Application Priority Data

Apr. 16, 1996 [FR] France .................................. 96 04710

[51] Int. Cl.$^7$ ...................................................... H01F 38/14
[52] U.S. Cl. .............................................................. 323/355
[58] Field of Search .................................... 323/355, 223, 323/265; 318/16, 480; 336/118, 119, 178

[56] References Cited

U.S. PATENT DOCUMENTS

| | | | |
|---|---|---|---|
| 4,229,689 | 10/1980 | Nickolaze | 322/32 |
| 4,914,539 | 4/1990 | Turner et al. | 361/18 |
| 5,818,188 | 10/1998 | Hirai et al. | 318/480 |

*Primary Examiner*—Adolf Deneke Berhane
*Attorney, Agent, or Firm*—Young & Thompson

[57] ABSTRACT

An installation for supplying electrical power to all the electrical consumers in a given area, the electrical consumers being without power lines and positioned in any spot whatsoever within the area. The installation comprises elements for inducing a magnetic field in the area and a number of units (1) associated with the electrical consumers for receiving the magnetic field and producing electrical power. The elements for creating a magnetic field include at least N turns of an electrical conductor situated on the circumference of the surface area, traversed by an alternating current, with at least one capacitor being placed in series in the turns. Application to electrical installations in premises and offices.

6 Claims, 1 Drawing Sheet

ELECTRICAL INSTALLATION USING ELECTROMAGNETIC INDUCTION

CROSS REFERENCE TO RELATED APPLICATION

This application is the national stage of international application PCT/FR97/00669 filed on Apr. 15, 1997, which designated the United States of America.

FIELD OF THE INVENTION

The present invention concerns generally an electrical system permitting not only illumination but also operation of any electrical equipment, such as a computer, television set, etc. More particularly, the invention concerns an electrical system comprising at least one electrical device which is supplied with energy by an induced magnetic field, and for which no connection by electrical wiring to the sector is needed.

BACKGROUND OF THE INVENTION

Conventionally, illumination of dwellings or establishments as well as the operation of various electrical equipment requires using electrical wiring for connections from the electrical outlets. The necessity of using such electrical wiring is a constraint which inconveniences its users. Specifically, outlets are rarely positioned in the most convenient location or in sufficient number, yet once they are used with the aid of extension cords, the user is disinclined to change the arrangement, even when it would be much preferable for example to prevent a multitude of cords traversing a room.

For supplying a place of business, greater flexibility should be possible as regards positioning various electrical office equipment such as a computer workstation, a telefax machine, a photocopier, etc. Setting up such an environment frequently requires a process of trial and error, and requires several attempts before a satisfactory configuration is achieved, which efforts would be greatly facilitated if connections by electrical wiring were not necessary.

It is known from French patent FR-B-2 717 614, to provide an illumination system in which lamp-type illuminating devices need no longer be connected by electrical wiring to the electrical distribution network or to any supply source.

Thus, a system for illuminating an area by means of a plurality of lamp-type illumination devices comprises lamp-type illuminating devices having no connecting electrical cords and which are disposed at any place within the area, and comprising means for inducing a magnetic field in the area as well as a plurality of means associated respectively with the lamp-type illuminating devices, each receiving the magnetic field and producing locally at each of the lamp-type illuminating devices an electrical supply energy. Thus, the said means for producing a magnetic field comprise at least one winding of electrical conductor disposed at the periphery of the area and traversed by an alternating current whereas each of the associated means comprises a coil composed of a plurality of windings between the terminals of which is induced an alternating voltage that supplies the associated illumination device with electrical energy.

However, for supplying electrical equipment other than lighting devices, this system has proven unsatisfactory for meeting all of the electrical current demands.

In particular, to produce a sufficient energy supply, it was necessary to provide a great number of windings and to use a rather high frequency. Consequently, impedance is thereby increased and, for a given electromotive force, the generated intensity will be low and out of phase with respect to the electromotive force.

SUMMARY OF THE INVENTION

To overcome this disadvantage, the present invention proposes a system which permits supplying energy to all of the electrical equipment provided in an area such as an office, without electric cords.

To that end, the invention has as an object a system for supplying electrical energy to all of the electrical equipment in an area, the electrical equipment having no electrical connecting cord and being disposed at any place within the area, comprising means for inducing a magnetic field in the area and a plurality of means associated with the electrical equipment for receiving the magnetic field and producing electrical supply energy, characterized in that the means for producing a magnetic field comprise at least N windings of electrical conductor disposed at the periphery of the area and traversed by an alternating current, capacitors being placed in series in the windings.

According to another characteristic, the value of the capacitors is selected such that the impedance depends only on the resistance, whereby the available intensity depends only on the electromotive force.

Advantageously, the resistance may be varied by varying the cross-section of the conductors.

It is noted that the field employed depends only on the product NI. The product NI permits determining the cross-section to be given to the cable housing, as well as the weight of copper necessary for the system.

Starting from the basic parameters, namely the intensity of the magnetic field and the weight of copper, the voltage and the output generated by the oscillator are selected for optimum economy.

According to an additional characteristic, each of the means associated with a piece of electrical equipment, or generator, comprises a coil composed of a plurality of windings, between the terminals of which an alternating voltage is induced serving to supply the associated electrical equipment with electrical energy, and a tuning capacitor connected to the coil. The capacitor advantageously permits tuning the frequency of the electrical equipment with respect to the frequency of the circuit.

Preferably, each of the associated means comprises a core of soft magnetic iron or constituted of iron wire about which the coil is disposed, a tuning capacitor being connected to the coil.

BRIEF DESCRIPTION OF THE DRAWINGS

Other characteristics and advantages of the invention will become apparent upon reading the detailed description of the drawing in which the sole FIGURE shows a secondary circuit or generator according to the invention.

DETAILED DESCRIPTION OF THE INVENTION

Figure 1:
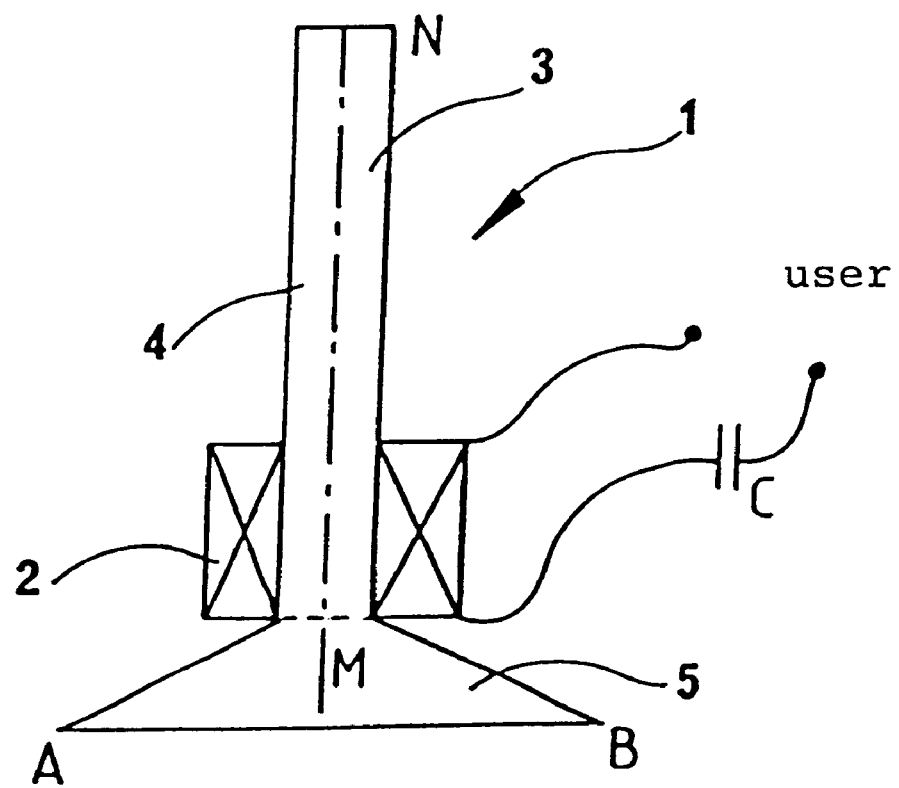

A preferred embodiment of the inductive electrical energy supply system essentially comprises a single-phase alternating current supply, a primary inductive circuit, and a plurality of electrical equipment.

The primary inductive circuit comprises N windings of electrical conductor constituting an electromagnetically inductive primary. The windings are connected in series such that the current delivered by the supply traverses the N windings consecutively before returning toward the supply.

The windings are installed about the periphery of a room such as an office and cover the area in which the electrical equipment operates.

Each piece of electrical equipment comprises a generator 1 or a secondary circuit having a core, an electrical device.

In a conventional manner, generator 1 essentially comprises a secondary coil 2 disposed about a core 3. The secondary coil 2 comprises a plurality of windings of copper wire, preferably 500 windings. The core 3 is preferably constituted of soft laminated magnetic iron. A tuning capacitor C is connected in series to the coil.

According to an embodiment of the invention, core 3 is in the form of a rod 4 one end 5 of which is of greatly enlarged shape. Thus, this surface of the base defined between points A and B of the enlarged portion 5 allows conditioning the power delivered by the secondary circuit or generator 1, whereas the height MN corresponds to the height of the rod 4 between the base of the enlarged portion and its end, is selected such that the negative effect of the magnetic pole which is formed at the end N of the rod 4 does not have a negative effect.

Thus, for supplying a computer, a generator has a bottom surface of 100 cm×25 cm for 150 cm of height.

The generator 1 is subjected to a magnetic field produced by the primary circuit and a voltage E of electromotive force is induced at the terminals of the secondary coil. The voltage E is used to supply the electrical equipment.

At least one capacitor is placed in series in the circuit. The value of the capacitor is chosen such that:

$$\omega L - \frac{1}{\omega C} = 0 \quad C = \frac{1}{\omega^2 L}$$

Consequently, the impedance satisfies the formula:

$$\sqrt{R^2 + \left(\omega L - \frac{1}{WC}\right)^2}$$

The impedance is reduced to the resistance R and there is thus obtained an available intensity which depends solely on the electromotive force.

Thus, for a frequency of 150 Hz, 64 windings of copper conductor having a section of 4 cm² are used, and the capacitance equals 75 $\mu$F for the room so equipped.

The secondary circuit or generator, like the primary circuit, should be tuned to this supply frequency and the tuning capacitor C whose capacity is 10 $\mu$F is therefore positioned in series.

The magnetic field is produced at the bottom, and thereafter decreases very rapidly such that it is negligible at a height of 50 cm above the base, which comports with safety standards such as those of IRPA/INIRC.

Since the generated magnetic field is not entirely uniform interiorly of the area surrounded by the conductive windings, each generator may be equipped with an electronic voltage regulator of a type known per se, which permits stabilizing its voltage.

Several generators may be in service simultaneously, by observing a spacing between them of at least about 1 meter.

I claim:

1. A system for supplying electrical energy to all electrical equipment within an area, the electrical equipment having no electrical connection cord and being positioned at any location within the area, comprising means for inducing a magnetic field in the area; a plurality of means associated with the electrical equipment for receiving the magnetic field and producing electrical supply energy; said means for inducing a magnetic field comprising at least a number N of windings of electrical conductor disposed at the periphery of the area and traversed by an alternating current, at least one capacitor being placed in series in the windings; said means associated with the electrical equipment comprising a secondary coil composed of a plurality of windings having terminals between which is induced an alternating voltage serving to supply electrical energy to the electrical equipment; and a tuning capacitor connected in series to the coil.

2. The system according to claim 1, wherein the value of said at least one capacitor is selected such that the impedance depends solely on resistance.

3. The system according to claim 1, wherein each of the means associated with the electrical equipment comprises a core of soft magnetic iron about which is disposed said coil.

4. The system according to claim 3, wherein the core is in the form of a rod having a first end and an opposite second enlarged end.

5. The system according to claim 1, wherein the means for producing a magnetic field comprises an alternating current supply for producing the alternating current in the windings of electrical conductor disposed on the periphery of the area.

6. The system according to claim 5, wherein the alternating current has a frequency of 150 Hz, the number N of windings is equal to 64, and the capacity is 75 $\mu$F.

* * * * *